United States Patent Office 2,769,684
Patented Nov. 6, 1956

2,769,684

PROCESS FOR STRIPPING AND LIGHTENING WOOL DYEINGS

Wilhelm Geigy, Binningen, Otto Albrecht, Neuewelt, near Basel, and Jules Meyer, Basel, Switzerland, assignors to Ciba Limited, Basel, Switzerland, a Swiss firm No Drawing. Application February 24, 1953, Serial No. 338,625

Claims priority, application Switzerland December 10, 1952

11 Claims. (Cl. 8—102)

This invention provides a process for stripping or lightening dyeings of wool dyestuffs on nitrogenous fibers such as wool, silk or synthetic fibers of like character from casein or polyamide or polyurethane fibers, but especially wool, wherein the dyed material is treated with the product of the action of at least 4 molecular proportions of an $\alpha:\beta$-alkylene oxide on 1 molecular proportion of an organic compound which contains at least one basic primary or secondary amino group or contains a basic tertiary amino group and also an alcoholic hydroxyl group, or with a salt or quaternary ammonium salt of such reaction product.

As starting materials for making the reaction products used in the process of the invention there are used $\alpha:\beta$-alkylene oxides, such as ethylene oxide, propylene oxide or glycide. Especially valuable products are obtained by using ethylene oxide.

As organic compounds which contain at least one basic primary or secondary amino group or contain a basic tertiary amino group and an alcoholic hydroxyl group there may be used amines of the aliphatic, aromatic or alicyclic series.

Among those of the aliphatic series there may be mentioned: Monamines, for example, methylamine, ethylamine, diethylamine, butylamine, hexylamine, dodecylamine, cetylamine, oleylamine or octadecylamine, and also polyamines such as ethylene diamine or triethylene tetramine. There may also be used basic derivatives of such amines, such as esters or hydroxy-amines with higher fatty acids, for example, coconut oil fatty acid triethanolamine ester, or partial amides of polyamines with fatty acids, for example, triethylene tetramine monoacylated with coconut oil fatty acid. Among the amines of the aromatic series there come into consideration above all amines of the benzene and naphthalene series containing alkyl side chains having, for example, 8-18 carbon atoms. Among those of the alicyclic series there are advantageously used resin amines such as abietylamine, abietylmethylamine, the amine mixture corresponding to tall oil which contain resin amines in addition to higher alkylamines, or hydrogenated abietylamine. There may also be used amidines such as lauric acid amidine or stearic acid amidine.

There are suitable for the purposes of the invention products obtainable by the reaction of one molecular proportion of an amine with at least 4, for example 4-50, molecular proportions of an alkylene oxide, for example, the reaction product of 1 mol of dodecylamine with about 6 mols of ethylene oxide, the reaction product of 1 mol of oleylamine with 6, 8 or 16 mols of ethylene oxide, the reaction product of one mol of stearylamine with 8 or 16 mols of ethylene oxide, and also the condensation product of one mol of coconut oil fatty acid triethanolamine monoester and 6 mols of ethylene oxide or of 1 mol of triethylene tetramine monoacylated with coconut oil fatty acid with 20 mols of ethylene oxide. There are also suitable the condensation products of 1 mol of a resin amine or hydrogenated resin amine with 5 mols of ethylene oxide or of 1 mol of an ordinary commercial mixture of resin amines and higher alkylamines with 16 mols of ethylene oxide.

The condensation products can be made by the usual methods for making such products, for example, by reacting the components together at a raised temperature. Advantageously the ethylene oxide is not added to the amine in one portion, but is gradually added thereto, for example, by adding or introducing it in the gaseous or liquid state to the amino-compound at a temperature at which the ethylene oxide enters into reaction, for example, at 50–200° C. If desired the operation may be carried out in a closed vessel and under pressure, advantageously at 2–10 atmospheres gauge pressure. If necessary, a catalyst may be added to the reaction mixture. As catalysts there come into consideration advantageously substances of alkaline reaction, such as metallic sodium, alkali hydroxides, alkali carbonates or alkali salts of carboxylic acids of low molecular weight.

The condensation products used in the invention are either soluble in water or easily dispersible therein. The water solubility may, if desired, be increased by the introduction of groups imparting solubility in water. Thus, for example, there may be used quaternary ammonium salts which contain an alkylene glycol chain derived from an $\alpha:\beta$-alkylene oxide and obtained, for example, by the addition of an alkylating agent to the reaction product of the primary, secondary or tertiary amine of the kind referred to above with the alkylene oxide. There may be mentioned the quaternary ammonium salt which is obtained by quaternating with dimethyl sulfate the reaction product of oleylamine with 6–10 mols of ethylene oxide.

Instead of using the reaction products of alkylene oxides with the primary, secondary or tertiary amines, there may be used products which are obtained by introducing into the amines polyglycol ether chains having a corresponding number of ether groups.

The material, of which the dyeing is to be stripped or lightened, may be dyed with any desired wool dyestuff, such as an acid wool dyestuff or a metalliferous dyestuff. It may be treated in any desired form, for example, in the form of yarn or fabric, or in loose form, for example, in the form of loose wool. The dyed material may be composed solely of the fibrous materials hereinbefore referred to. Alternatively, it may be a mixed fabric, including a mixed fabric of such fibers with cellulose fibers. For the treatment of mixed fabrics of the latter kind the condensation products are advantageously applied in acid solution, because in this way the dyeing on the nitrogenous fibers is preferentially stripped or lightened.

The treatment of the dyed material in accordance with the invention with the condensation products described above is carried out in an aqueous bath and advantageously at a raised temperature. The quantity of the condensation product used depends mainly on the strength of the dyeing which is to be stripped or lightened, and on the resistance of the dyestuff to removal. This quantity can easily be determined in any particular case by preliminary tests. In general, a few percent of a condensation product calculated on the weight of the fiber suffice to produce satisfactory results. The treatment may be carried out in an acid, neutral or alkaline medium. Preferably the treatment bath has an acid reaction. In stripping or lightening dyeings by the present process in an acid or neutral medium the fibers suffer hardly any injury, and this is of great importance. The treatment baths can be prepared in a simple manner by dissolving the condensation product in the necessary quantity of water.

The following examples illustrate the invention the parts being by weight unless otherwise stated and the relationship of parts by weight to parts by volume being the same as that of the kilogram to the liter:

Example 1

Wool yarn, which has been dyed with 3 percent of Cloth Fast Blue (Colour Index No. 288/289), is treated for one hour at 90° C. in a bath which contains on the weight of the fiber 2–5 percent of the condensation product described bleow and 4 percent of acetic acid of 40 percent strength. The yarn is then rinsed and dried. There is obtained by this treatment a good stripping effect.

The condensation product used above may be prepared as follows:

100 parts of a commercial mixture containing 45 percent oleylamine, 25 percent octadecylamine and 30 percent hexadecylamine are mixed with 1 part of finely dispersed sodium and heated to 140° C. and then ethylene oxide is introduced at 135–140° C. As soon as the ethylene oxide is being rapidly absorbed, the reaction temperature is lowered to 120–125° C. and the introduction of ethylene oxide is continued until 113 parts thereof have been absorbed. The reaction product so obtained is soluble in water to give a practically clear solution.

The condensation product of 1 mol of oleylamine with 8 mols of ethylene oxide obtainable in an analogous manner may be used in the same way.

Example 2

The procedure is the same as that described in Example 1, except that the treatment is applied to wool or nylon dyed with one of the following dyestuffs: Benzyl Bordeaux B (Colour Index No. 85), Chrome Blue-black B (Colour Index No. 1085), Chrome Fast Cyanine BSS (Colour Index No. 202) or the green dyeing chromium compound of the monoazo-dyestuff from diazotized 1-hydroxy-2-amino-5-nitrobenzene and 2-aminonaphthalene-6-sulfonic acid.

As an acid for addition to the stripping bath there may be used, instead of acetic acid, sulfuric acid, formic acid or oxalic acid. The concentrations of the acid and of the stripping agent depend on the class of dyestuff to be treated and the stripping effect which is desired.

Example 3

The procedure is the same as that describde in Example 1, except that instead of the condensation product used therein, there is used one of the condensation products of which the preparation is described below, or a mixture of two or more of these products.

(a) 20 parts of commercial stearylamine are mixed with 0.2 part of finely dispersed sodium and the mixture is heated to 130° C., whereupon ethylene oxide is introduced at 120–130° C. until 44.8 parts have been taken up. The ethylene oxide derivative so obtained is soluble in water to give a practically clear solution.

(b) 20 parts of an ordinary commercial mixture of higher alkylamines and resin amines are mixed with 0.2 part of sodium, and the mixture is heated to 130° C., and then ethylene oxide is introduced in a finely distributed form at 120–130° C. until 44.8 parts have been taken up. The product so obtained is soluble in water to give a practically clear solution.

(c) 30 parts of coconut oil fatty acid triethanolamine monoester are mixed with 0.15 part of sodium, and then ethylene oxide is introduced in a finely distributed form until 77 parts have been taken up. The reaction product is soluble in water to give a clear solution.

(d) 21.4 parts of commercial oleylamine are mixed with 0.2 part of sodium, then ethylene oxide is introduced in the form of a finely distributed gas stream at 120–125° C. until 48.5 parts have been taken up. The reaction product so obtained is soluble in water to give a practically clear solution.

(e) 73 parts of triethylene tetramine are heated to 145° C., and then 106 parts of coconut oil fatty acid are introduced, while stirring, in the course of 5 hours at 145–150° C. while passing nitrogen through the mixture. The whole is then stirred for 4 hours at 140–145° C.

25 parts of the amide so obtained are mixed with 0.12 part of sodium and heated to 165° C., and then ethylene oxide is introduced at 160–165° C. in the form of a finely distributed gas stream until 21.2 parts have been taken up. There is obtained a reaction product which gives a practically clear solution in water.

(f) 20 parts of commercial dodecylamine are heated to 125° C., and then ethylene oxide is introduced at 120–125° C. in a finely distributed form until 22.4 parts have been taken up. The amine derivative so obtained is an oil which is easily soluble in water.

(g) 20 parts of commercial oleylamine are mixed with 0.1 part of sodium and heated to 125° C., and then ethylene oxide is introduced at 120–125° C. until 17.5 parts have been taken up.

(h) 80 parts of ethylene oxide are introduced at 158–163° C. in the course of about 2–3 hours into 144 parts of hydrogenated abietylamine (Rosin Amine D), in which 0.2 part of metallic sodium are suspended. At the end of the reaction some sodium is still present, and this is mechanically removed.

The reaction product is a pale colored very viscous mass which is soluble to give a clear solution in a large quantity of water with the addition of a little acid.

Instead of the condensation products described under (a) to (h) water-soluble salts thereof may be used.

(i) 6–10 mols of ethylene oxide are reacted at 150–155° C. in the presence of a small amount of metallic sodium with 1 mol of oleylamine. In order to prepare a quaternary salt thereof the reaction product is heated with dimethylsulfate at 70–80° C.

Example 4

Union piece-goods, dyed with 3 percent of Chlorantine Fast Red 7BL (Colour Index No. 278) are treated for 1 hour at 90° C. in a bath which contains on the weight of the fiber 3 percent of the condensation product described in Example 1 and 3 percent of formic acid. The fabric is then rinsed and dried. By this treatment the dyestuff is stripped preferentially from the wool in the union.

Dyeings obtained with the following dyestuffs can be stripped in similar manner. Direct Green B (Colour Index No. 593), Chlorantine Fast Orange G (Colour Index, page 32 of Supplement), Chlorantine Fast Blue 3GL (Schultz, Farbstofftabellen, vol. 2, page 47), and Benzyl Fast Blue 3GL (Schultz, Farbstofftabellen, vol. 2, page 35).

What is claimed is:

1. A process for lightening and stripping dyeings of wool dyestuffs on basic nitrogenous fibers, which consists in contacting the dyed material with a condensation product selected from the group consisting of condensation products of at least 4 mols of an $\alpha,\beta$-alkylene oxide and one mol of a primary amine which contains a hydrocarbon radical with at least 10 carbon atoms and water-soluble salts of such condensation products.

2. A process for lightening and stripping dyeings of wool dyestuffs on basic nitrogenous fibers, which consists in contacting the dyed material with a condensation product of at least 4 mols of ethylene oxide and one mol of an aliphatic primary amine containing a higher molecular hydrocarbon radical containing at least 10 carbon atoms.

3. A process for lightening and stripping dyeings of wool dyestuffs on basic nitrogenous fibers, which consists in contacting the dyed material with a condensation product of at least 4 mols of ethylene oxide and one mol of an alicyclic primary amine containing a higher molecular hydrocarbon radical containing at least 10 carbon atoms.

4. A process for lightening and stripping dyeings of wool dyestuffs on basic nitrogenous fibers, which consists in contacting the dyed material with a condensation product of one mol of dodecylamine and 6 mols of ethylene oxide.

5. A process for lightening and stripping dyeings of wool dyestuffs on basic nitrogenous fibers, which consists in contacting the dyed material with a condensation product of one mol of oleylamine and 8 mols of ethylene oxide.

6. A process for lightening and stripping dyeings of wool dyestuffs on basic nitrogenous fibers, which consists in contacting the dyed material with a condensation product of one mol of triethylene tetramine monoacylated with a coconut oil fatty acid and 20 mols of ethylene oxide.

7. A process for lightening and stripping dyeings of wool dyestuffs on basic nitrogenous fibers, which consists in contacting the dyed material with a condensation product of 1 mol of hydrogenated abiethylamine and 5 mols of ethylene oxide.

8. A process for lightening and stripping dyeings of wool dyestuffs on fabrics consisting of cellulose fibers and basic nitrogenous fibers, which consists in contacting the dyed material with a condensation product selected from the group consisting of condensation products of at least 4 mols of an α,β-alkylene oxide and one mol of a primary amine which contains a hydrocarbon radical with at least 10 carbon atoms and water-soluble salts of such condensation products.

9. A process for lightening and stripping dyeings of wool dyestuffs on fabrics consisting of cellulose fibers and basic nitrogenous fibers, which consists in contacting the dyed material in an acidic aqueous bath with a condensation product of 1 mol of oleylamine and 8 mols of ethylene oxide.

10. A process for lightening and stripping dyeings of wool dyestuffs on basic nitrogenous fibers, which consists in contacting the dyed material with a condensation product of at least 4 mols of ethylene oxide and one mol of a commercial mixture of 45 percent oleylamine, 25 percent octadecylamine and 30 percent hexadecylamine in an aqueous bath at a temperature of 80–100° C.

11. A process for lightening and stripping dyeings of wool dyestuffs on basic nitrogenous fibers, which consists in contacting the dyed material with a condensation product of 8 mols of ethylene oxide and one mol of a commercial mixture of 45 percent oleylamine, 25 percent octadecylamine and 30 percent hexadecylamine in an aqueous bath at a temperature of 80–100° C.

References Cited in the file of this patent
UNITED STATES PATENTS

| | | |
|---|---|---|
| 1,923,178 | Ulrich | Aug. 22, 1933 |
| 1,970,578 | Schoeller | Aug. 21, 1934 |
| 2,003,928 | Evans | June 4, 1935 |
| 2,042,194 | Schoeller | May 26, 1936 |
| 2,155,135 | Kartaschoff | Apr. 18, 1939 |
| 2,185,163 | Ulrich | Dec. 26, 1939 |
| 2,525,770 | Cook | Oct. 17, 1950 |